United States Patent Office 3,625,092
Patented Dec. 7, 1971

3,625,092
METHOD FOR MANUFACTURING DIES FOR STAMPING GRADUATED SCALES ON SLIDE RULES AND RULES FOR TECHNICAL PURPOSES
Iosif Hondrea and Mihai Hilger, Timisoara, Francisc Moser, Bucharest-sos, and Iosif Glass, Timisoara-piata, Romania, assignors to Iprofil-Tehnolemn, Timisoara, Romania
Filed Aug. 11, 1969, Ser. No. 849,041
Int. Cl. B21k 5/20
U.S. Cl. 76—107 R          5 Claims

ABSTRACT OF THE DISCLOSURE

A method of embossing scales upon a thermally softenable surface of a slide rule or the like in which the die is subjected to multiple heat treatments to relax the internal stress, is precision engraved with the pattern to be embossed at the embossing temperature and is thereafter milled at ordinary temperatures with optical control of the milling operation to define a deep relief pattern equivalent to that to be formed in the rule face.

(1) FIELD OF THE INVENTION

The invention relates to a method for directly manufacturing precise dies for stamping graduated scales on the celluloid of slide-rules and technical rules.

(2) BACKGROUND OF THE INVENTION

The realization of graduated scales on slide-rules and technical rules by photographing on their milk-white celluloid, with a sensitive layer, has been abandoned, because the obtained divisions were rapidly erased.

In the last decades these graduated scales were realized with brazen dies, having the divisions in relief, by cameo printing. On the rules which were to be printed, which already have celluloid sheets applied thereto or are completely of plastic, impression of the divisions and marks is done in a flat electro-pneumatical press by limited impressing, with progressive pressure at a temperature of 80 to 90° C.

The necessary impressing dies are manufactured out of soft brass with divisions in relief, being obtained by cold stamping with impact on a steel patrice, having the divisions and the marks engraved. These patrices, deeply engraved, are obtained by milling with a pantograph machine a flat steel plate, which is afterwards quench hardened.

The known method results in dies of soft metal which rapidly wear out; special implements are necessary and the process requires much manual labor. The resulting impressions have dimension differences, partly due to the insufficient precision of the milling pantograph, to the deformation during quenching and to the loss of precision when stamped. These differences amount to 0.2 to 0.3 mm., the rule with 250 mm. of divided length; they do harm to the measuring and reduction scales of the rules for technical use; when stamping the divisions on slide-rules some variations occur, which are different along the scale, a fact which damages exactitude of the calculation.

(3) OBJECT OF THE INVENTION

The invention has as its object the provision of a method of manufacturing precise dies for stamping graduated scales on slide-rules and rules for the technical uses, which does away with the drawbacks of the known methods.

(4) SUMMARY OF THE INVENTION

With the method according to invention, the die is directly realized, with the divisions and different marks in high relief in a hard-rolled brazen plate.

The brazen plate is previously subjected to a heat treatment in order to ensure dimensional stability, with the aim to eliminate inner stresses, the existence of which is inherent in a rolled brazen plate. This distressing thermal treatment, cyclically repeated, with ageing of the brass consists of many heatings in the furnace up to a temperature of about 550° C., followed by slow cooling of the brass plate.

This treatment eliminates the developing in the die, when heated for stamping, of remanent deformations, variable along the various scales, which reduce the exactness of the calculations with the slide-rule, respectively of the measurements, in case of measuring scales. It is sufficient to show that on the exponential scale $LL_3$ of a 10 cm. pocket slide-rule, at the right end of the scale, a difference equal to the thickness of a division represents numerically the value of 1,500.

On the thermally-treated metallic plate for ensuring dimensional-stability a fine previous tracing of the divisions of the scale is produced, so that these divisions are visible with a measuring microscope. This previous tracing, having a thousandth-millimetre precision is performed with a length dividing machine, compared with the less precise mechanical milling pantograph with a precision only a tenth of a millimetre.

Besides this, the pretracing of the different scales on the treated metallic plate is performed in a uniform expanded state, at the temperature which it will have when used for stamping; if celluloid, at 86° C.; for other plates, at a corresponding temperature. For this purpose, the metallic plate is expanded, when pretracing, by putting it on the table of the dividing machine over a flat metallic housing with internal electrical resistances, thermally insulated against the plate of the dividing machine, so as not to disturb its working precision.

The pretracing on the heated plate at the stamping temperature directly places these divisions at the locations accordingly to their calculation tables with an error of a thousandth of a millimeter calculated correspondingly for the respective logarithmic scales, for the technical temperature of the stamping stage, without the use of corrections. With dies having the divisions cold milled in this manner and contracted corresponding to the future thermal elongation caused by expansion, the divisions are impressed hot upon the celluloid of the various rules, which divisions correspond at the surrounding temperature to the correct places, with the superior precision offered by the length-dividing machine.

A simple calculation shows that, for scales with a divided length of 250 mm., in this manner, with brazen dies an error of about +0.3 mm. is corrected; for a steel die the error is about 0.25 mm. These differences are not admissible for the millimetric measuring scales and for the slide-rules.

In order to manufacture directly the dies according to this invention, auxiliary metallic patterns are needed, which comprise in high relief the divisions of the graduated scales and the marks of the slide rules. These patterns are manufactured at an enlarged scale, at a normal temperature of 24° C., milling the divisions in relief with aid of a pantograph with a working precision of a tenth of a millimeter. The auxiliary patterns of the scales of the rules can be realized with rolled aluminum at an enlargement scale of one to 3 to one to 10 according to the scale to be stamped. They can be executed in several parts containing the scales in continuation.

The execution according to the invention of the divisions in high relief of the graduated scale on the stress relaxed plate and with the divisions previously hot traced, with the precise dividing machine is performed by milling at the normal surrounding temperature. First, a gross milling of the scale divisions is performed with aid of the mechanical milling pantograph, which follows successively with the following head the divisions of the auxiliary patterns on the parts and which control, with the other head, at a corresponding reduced scale a vertical miniature milling machine, which reproduces the divisions in relief on the plate of the die in execution. Then, continuing, the precision milling is performed for placing and for the precise width of each division in relief, milling the two sides of the division in the proximity of the previously traced division and symmetrically to it. This precise milling of the divisions of the die is watched by the pantographist in the view-field of a measuring microscope and is manually corrected in accordance with the previously traced divisions.

The various marks of the scale, i.e.—figures and letters, etc.—found on the patterns are milled in relief with the mechanical pantograph in the known manner; they do not require the precise milling watched by microscope.

By gross milling with the pattern, cutting of the principal metal mass and the tracing of the divisions in relief, the precision of a tenth of a millimeter allowed for the mechanical pantograph is realized. The fine precise milling watched with the measuring microscope allows the precise finishing of the division reliefs upon the fine previously traced division lines.

The method allows direct milling of the dies with divisions in relief, with a mechanical pantograph, with a superior precision to that realized only by the length dividing machine using milling with precision correction obtained by watching by microscope.

The wear resistance of the brazen die, realized according to this invention, can be increased by hard chrome plating. The usual layer of such plating has a thickness which cannot be used as it would widen the divisions of the scales and would reduce the precision of calculations with the slide rule. It has been observed that when hot stamping is used, if in the mass of the plastic there is a layer of hard chrome of only 1 to 2 microns, the wear resistance increases about four times. Wear resistance is obtained also chemically. When stamping on hot celluloid, nitrogen oxides are emitted, the corrosion of which affects hard chrome less than the brass of nonchrome plated brass of the die.

(5) DESCRIPTION OF THE DRAWING

The drawing illustrates the method as applied for stamping the face of a slide-rule with a divided length of 250 mm.

(6) SPECIFIC DESCRIPTION

Figure 1:
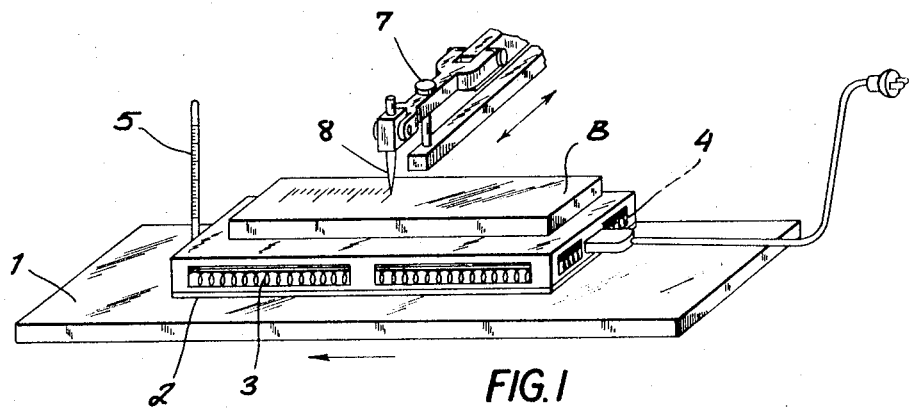
FIG. 1 is a perspective view of the electro-thermal device on the dividing machine for hot pretracing of the divisions of the scale on the metallic plate prepared to become a die.
Figure 2:
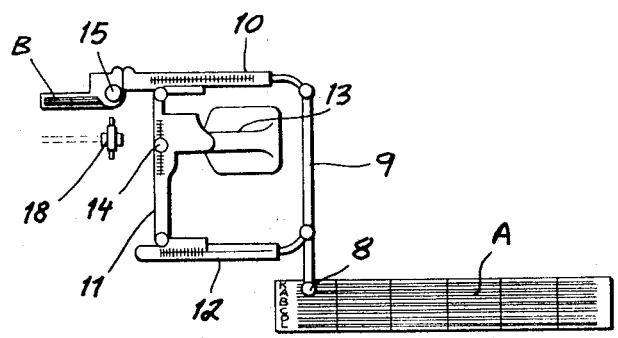
FIG. 2 is a diagrammatic horizontal plan view for milling with the mechanical pantograph, performed under microscopic observation and correction of the precision of the divisions of the graduated scale at the die with the pretraced divisions at room temperature.

For manufacturing a die, a metallic plate 1 of hard rolled brass is used, with a high copper content (63%) finely machined by planing to the final dimensions and with its face to be traced plane grinded and mirror polished.

Before planing and grinding, the plate 1 has been thermal-treated for stress relaxing and ageing of the material, in order to ensure dimensional stability. This consisted of introducing the plate into a furnace at about 550° C. over 16 hours, followed by a slow cooling down to 20° to 24° C. during eight hours. The operation is repeated practically 15 to 20 times. A dilatometric test carried out with a series of fine marks every 5 hours on a region of the plate and in its length which will not have graduated scales, must show that the plate, previously heated to the pretracing conditions and air cooled 10 times, presents dimensional stability in its whole length: the distances between the marks are maintained practically unchanged. When so, the material of the plate has been stress-relaxed and has become stable in length and apt to become a die; this will no more suffer any remanent deformation during heating for stamping, which would modify the distances between the divisions of its scales.

The metallic plate 1, prepared in this manner for execution of the die is submitted to the fine pretracing of the divisions of the various scales, at the right places, with aid of the tracing cutter 2, fixed upon the mobile arm 3 of the linear dividing machine with the precision of a thousandth of a millimeter.

Prior to pretracing, the plate 1 was placed upon a heating metallic housing 4 which has inside electrical resistances 5 of spiral wire uniformly distributed, insulated from the housing 4, at the base, laterally and at the ends with thermal insulating asbestos cardboard. The electrical resistances are fed from the electric supply network by means of the insulated electric cord 6. Another thermally insulating layer of asbestos cardboard separates the base of the metallic housing 4 from the mobile plate 7 of the dividing machine, the advance motion of which is shown by an arrow.

The metallic housing 4 is heated and maintained at 86° C., permanently indicated by a thermometer 8. The electric heating device may be completed with known thermostatic equipment. Tests with surface thermometers show that the plate 1 is maintained in this way at 85 to 86° C., which is also the die temperature when the graduated scales are stamped upon the celluloid milk-white sheets, applied to the slide-rules prepared for impressing the scales.

Therefore, pretracing of the divisions is performed on the plate 1, fixed, as shown, onto the dividing machine and heated at 86° C.

It is understood that the thermal insulating plate 8 maintains the dividing machine at the normal working temperature conditions so that the distances between the pretraced divisions correspond to the dividing with a dividing machine at the normal surrounding operating temperature.

The precision of the pretraced divisions are controlled in such a manner, that they may be visible through the measuring microscope, with which the milling of the die will be watched and corrected.

The distances between the successive divisions of the various scales of the slide-rule are those which correspond to their calculating tables at the thousandth part of a millimeter, corresponding to the respective calculating logarithmic scales.

The metallic plate 1 having pretraced the divisions of all the scales which are to be impressed simultaneously on the slide-rule, is passed to milling in high relief, at normal surrounding temperature, in order to become a stamping die. The mechanical milling pantograph 10 is used, which has an operating precision of a tenth of a millimeter.

For operating with the pantograph, the auxiliary metallic die 11 of rolled aluminum is used, on which, in high relief the graduated scales and the various supplementary marks of the rule are realized, which are to be reproduced on the plate 1. The pattern 11 is formed at the enlargement scale of 5:1.

For the 250 mm. long rule the pattern 11 is made in six parts in continuation with some additional divisions at the joining ends of the parts of the pattern.

The various marks, consisting of numbers and letters belonging to the patterns, at the respective scales can be realized out of a thermoplastic material as e.g. polyacrylic by chill-casting in aluminum moulds. They are fixed at the place of the divisions to be marked in the grooves of the aluminum pattern milled for this purpose.

In order to mill the die 1, the reducing pantograph is adjusted to the scale 1:5, the scale being corrected at the arm of the pantograph, at the calculated value, taking into account the contraction of the die with pretraced divisions, from the temperature of 86° C. to the normal one of 24° C. when milling.

Figure 3:
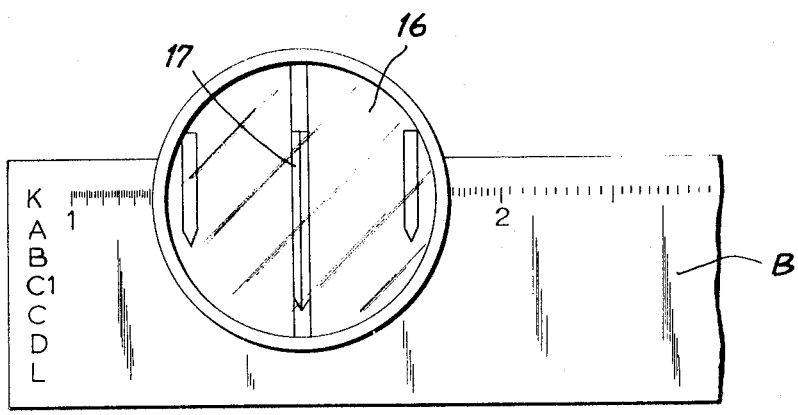
FIG. 3 is a view of the image in the field of the microscope, during precise milling of the sides of a pretraced division.

With the following head 12 of the mechanical pantograph so adjusted, the gross milling in high relief is performed, the first part of each scale of the die 1 using the actuating of the second leg of the pantograph of the milling head 13 of a form vertical milling machine, miniature type, equipped with a corresponding milling cutter. The various marks contained in the pattern are also milled in high relief. Afterwards, the fine milling for the precise execution of the divisions begins. The sides of each division are milled with the milling head 13, guided by hand, and the milling is watched optically by means of the measuring microscope 14 with the enlargement 40, placed upon a mobile support in front of the milling cutter. In this way, a division (FIG. 3) is realized, having an established width at the crest, its position being so corrected that its sides are symmetrically disposed in regard of the fine pretraced division $b$, $c$. One after the other the divisions of the gross milled part are finely milled. By successive replacing of the pattern parts and corresponding displacing of the die 1 all the divisions of the scale are finely milled.

All divisions finished with high relief in this way are placed at the positions of the fine divisions previously traced with the precision of a thousandth of a millimeter by means of the dividing machine.

After the fine milling of the whole die 1, it is hard chrome plated in the known manner on the working surface, with a chrome layer thickness of not more than 2 microns. This chrome plating increases the wear resistance of the die 1 of hard rolled brass about 4 times compared a nonchrome-plated die.

The chrome plated die is used for stamping slide-rules on their milk-white celluloid sheets at a temperature of 86° C. For stamping, an electro-pneumatic press is used, which impresses limitedly with a progressive pressure up to 25 kp./cm².

It is obvious that the impressing of the graduated scales can be done upon another thermoplastic material at which the best temperature and pressure coresrponding operating conditions are taken into consideration, making sure that the same heating temperature would be used also when the divisions of the die are pretraced.

We claim:
1. A method of applying a scale having a multiplicity of divisions to a thermally softenable rule face, comprising the steps of:
   (a) engraving a flat die blank at an embossing temperature of said face with a multiplicity of division marks corresponding to the locations of the divisions of said face upon contraction of said blank;
   (b) milling said blank at a lower temperature to execute said division marks in the form of high relief on a relief die by optical alignment with successive division marks and the milling of said blank to form reliefs of other division marks; and
   (c) embossing said face at said embossing temperature with the relief die formed in step (b).

2. A method defined in claim 1 wherein said blank is composed of brass, further comprising the step of thermally treating said plate in advance of step (a) by alternately heating and cooling the blank to dimensional stability.

3. A method defined in claim 2, further comprising the step (d) of finely milling said reliefs with mechanical control from the pattern of said division marks.

4. The method defined in claim 3 wherein additional scale markings are formed in high relief on said blank by milling with auxiliary-pattern control with a pantograph ratio 3:1 to 10:1.

5. The method defined in claim 4, further comprising the step (e) of applying a hard-chromium plating to said reliefs in a thickness of 1 to 2 microns.

References Cited

UNITED STATES PATENTS 2,664,787   1/1954   Plimmer   33—125 UX

FOREIGN PATENTS 1,221,417   1/1960   France   33—125

BERNARD STICKNEY, Primary Examiner

U.C. Cl. X.R.

33—125 R, 125 T; 90—13.1